United States Patent
Rajpathak et al.

(10) Patent No.: US 12,265,416 B2
(45) Date of Patent: Apr. 1, 2025

(54) LOW POWER AND AREA CLOCK MONITORING CIRCUIT USING A CAPACITOR AND CONSTANT CURRENT SINK

(71) Applicant: NVIDIA Corporation, Santa Clara, CA (US)

(72) Inventors: Kedar Rajpathak, Santa Clara, CA (US); Tezaswi Raja, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 87 days.

(21) Appl. No.: 18/295,560

(22) Filed: Apr. 4, 2023

(65) Prior Publication Data
US 2024/0338051 A1 Oct. 10, 2024

(51) Int. Cl.
*G06F 1/08* (2006.01)
*G06F 1/12* (2006.01)

(52) U.S. Cl.
CPC . *G06F 1/08* (2013.01); *G06F 1/12* (2013.01)

(58) Field of Classification Search
CPC .................................... G06F 1/08; G06F 1/12
See application file for complete search history.

(56) References Cited

U.S. PATENT DOCUMENTS

| | | | | |
|---|---|---|---|---|
| 4,055,129 A | * | 10/1977 | Hunts | H03K 17/955 112/443 |
| 7,038,509 B1 | * | 5/2006 | Zhang | H03L 7/1976 375/376 |
| 2004/0117693 A1 | * | 6/2004 | Moriyama | G06F 21/755 714/701 |
| 2020/0350861 A1 | * | 11/2020 | Girani | H03L 7/0802 |

* cited by examiner

*Primary Examiner* — Paul R. Myers (57) ABSTRACT

Circuitry and a method of operating a clock monitoring circuit for monitoring a clock signal is disclosed. The method comprises charging a first capacitor connected to a connection between a first pair of transistors and a voltage reference, charging a second capacitor connected to a connection between a second pair of transistors and to the voltage reference, sinking a current from the first and second pair of transistors with a constant current sink, and asserting a clock slow detect (CSD) signal when a voltage at the constant current sink drops below a threshold indicating durations of phases of the clock signal lengthen.

41 Claims, 9 Drawing Sheets

LOW POWER AND AREA CLOCK MONITORING CIRCUIT USING A CAPACITOR AND CONSTANT CURRENT SINK

TECHNICAL FIELD

This application is directed, in general, to monitoring clock signals and, more specifically, to detecting abnormalities in those clock signals.

BACKGROUND

Most digital systems rely on a clock signal in order to function. For example, virtually all modern computing platforms-such as, e.g., mobile devices, desktop computers, and rack-mounted compute nodes in data centers-depend on a system clock signal to execute instructions that enable them to perform their intended functions.

A typical system clock signal can be generated by a circuit that includes a quartz crystal to ensure very accurate and stable oscillations. When properly functioning, the clock signal oscillates between two opposite state phases corresponding, respectively, to a "high" voltage level (e.g., a "high" state or a "high" phase) and a "low" voltage level (e.g., a "low" state or a "low" phase). Usually a clock signal oscillates at a fixed clock frequency, in which a single oscillation cycle corresponds to a fixed clock period having a duration that depends on the fixed clock frequency and includes both the high phase and low phase. In most digital systems, the clock signal is designed to oscillate with a 50% duty cycle. That is, during each clock cycle, the clock signal is designed to exhibit a stable high phase for one half of the clock period and a stable low phase for the other half of the clock period. These states repeat in a strictly alternating fashion from one clock cycle to the next. In some digital systems, the clock signal may be designed to oscillate with a duty cycle other than 50%.

In any such digital systems, one type of clock abnormality occurs when the clock stops oscillating entirely (e.g., a clock "stop"). Another type of clock abnormality occurs when the clock exhibits a duty cycle other than the expected duty cycle (e.g., a clock "glitch"). Other clock abnormalities occur, e.g., when a clock cycle is missed or when the clock frequency increases or decreases. Any of these clock abnormalities can be cause for concern in a digital system because their occurrence may cause the digital system to behave unexpectedly. These abnormalities can occur naturally, e.g., influenced by physical phenomena impingement on the clock signals. Additionally, these abnormalities can occur as a result of a malicious intended alteration of the clock signals which create vulnerabilities to security attacks that are designed to exploit the clock timing of the digital system.

It is desirable, therefore, to detect clock abnormalities if and when they occur and to respond to them quickly.

SUMMARY

In one aspect, a clock monitoring circuit for monitoring a clock signal is disclosed. In one embodiment, the clock monitoring circuit comprises a clock slow detection (CSD) circuit. In one embodiment, the CSD circuit is configured to assert a CSD signal when durations of phases of the clock signal lengthen. In one embodiment, the CSD circuit comprises two pairs of transistors, a constant current sink, and an inverter. Each pair of the two pairs of transistors is connected in series and a first capacitor is connected to a connection between a first pair of the two pairs of transistors and to a voltage reference. A second capacitor is connected to a connection between a second pair of the two pairs of transistors and to the voltage reference. A third capacitor is connected to drains of a second transistor of each of the two pairs of transistors and to the voltage reference. The constant current sink is connected to the drains of the second transistor of each of the two pairs of transistors and to the voltage reference. The inverter is coupled to the third capacitor and the constant current sink. A voltage supply is connected to a source of a first transistor of each of the two pairs of transistors. A high phase of the clock signal is connected to gates of the first transistor of the first transistor pair and the second transistor of the second transistor pair. A low phase of the clock signal is connected to gates of the second transistor of the first transistor pair and the first transistor of the second transistor pair.

In another aspect, an integrated circuit (IC) is disclosed. The IC comprises at least one processing subsystem and at least one clock monitoring circuit for monitoring a clock signal coupled to the clock signal externally generated from the IC or a plurality of clock signals generated internal to the IC and the at least one processing subsystem. In one embodiment, the at least one clock monitoring circuit comprises a clock slow detection (CSD) circuit configured to assert a CSD signal when durations of phases of the clock signal lengthen. In one embodiment, the CSD circuit includes two pairs of transistors, a constant current sink, and an inverter. Each pair of the two pairs of transistors is connected in series and a first capacitor is connected to a connection between a first pair of the two pairs of transistors and to a voltage reference. A second capacitor is connected to a connection between a second pair of the two pairs of transistors and to the voltage reference. A third capacitor is connected to drains of a second transistor of each of the two pairs of transistors and to the voltage reference. The constant current sink is connected to the drains of the second transistor of each of the two pairs of transistors and to the voltage reference. The inverter is coupled to the third capacitor and constant current sink. A voltage supply is connected to a source of a first transistor of each of the two pairs of transistors. A high phase of the clock signal is connected to gates of the first transistor of the first transistor pair and the second transistor of the second transistor pair. A low phase of the clock signal is connected to gates of the second transistor of the first transistor pair and the first transistor of the second transistor pair.

In another aspect, a method of operating a clock monitoring circuit for monitoring a clock signal is disclosed. In one embodiment, the method comprises charging a first capacitor connected to a connection between a first pair of transistors and a voltage reference, charging a second capacitor connected to a connection between a second pair of transistors and to the voltage reference, sinking a current from the first and second pair of transistors with a constant current sink, and asserting a clock slow detect (CSD) signal when a voltage at the constant current sink drops below a threshold indicating durations of phases of the clock signal lengthen. The first capacitor is charged by applying a high phase of the clock signal to a gate of a first transistor of the first pair of transistors and by applying a low phase of the clock signal to a gate of the second transistor of the first pair of transistors. The second capacitor is charged by applying the low phase of the clock signal to a gate of a first transistor of the second pair of transistors and by applying the high phase of the clock signal to a gate of a second transistor of the second pair of transistors.

In another aspect, a method of manufacturing an integrated circuit (IC) is disclosed. In one embodiment, the method comprises forming a clock slow detection (CSD) circuit for monitoring a clock signal configured to assert a CSD signal when durations of phases the clock signal lengthen. In one embodiment, the CSD circuit includes two pair of transistors, a constant current sink, and an inverter. Each pair of the two pairs of transistors is connected in series and a first capacitor is connected to a connection between a first pair of the two pairs of transistors and to a voltage reference. A second capacitor is connected to a connection between a second pair of the two pairs of transistors and to the voltage reference. A third capacitor is connected to drains of a second transistor of each of the two pairs of transistors and to the voltage reference. The constant current sink is connected to the drains of the second transistor of each of the two pairs of transistors and to the voltage reference. The inverter is coupled to the third capacitor and constant current sink. A voltage supply is connected to a source of a first transistor of each of the two pairs of transistors. A high phase of the clock signal is connected to gates of the first transistor of the first transistor pair and the second transistor of the second transistor pair. A low phase of the clock signal is connected to gates of the second transistor of the first transistor pair and the first transistor of the second transistor pair.

In another aspect, a battery powered device is disclosed. In one embodiment, the battery powered device comprises at least one processing subsystem and a clock monitoring circuit coupled to an externally generated clock signal or a plurality of internally generated clock signals generated and the at least one processing subsystem. In one embodiment, the clock monitoring circuit comprises a clock slow detection (CSD) circuit configured to assert a CSD signal when durations of phases the clock signal lengthen. In one embodiment, the CSD circuit includes two pairs of transistors, a constant current sink, and an inverter. Each pair of the two pairs of transistors is connected in series and a first capacitor is connected to a connection between a first pair of the two pairs of transistors and to a voltage reference. A second capacitor is connected to a connection between a second pair of the two pairs of transistors and to the voltage reference. A third capacitor is connected to drains of a second transistor of each of the two pairs of transistors and to the voltage reference. The constant current sink is connected between the drains of the second transistor of each of the two pairs of transistors and the voltage reference. The inverter is coupled to the third capacitor and constant current sink. A voltage supply is connected to a source of a first transistor of each of the two pairs of transistors. A high phase of the clock signal is connected to gates of the first transistor of the first transistor pair and the second transistor of the second transistor pair. A low phase of the clock signal is connected to gates of the second transistor of the first transistor pair and the first transistor of the second transistor pair.

BRIEF DESCRIPTION OF THE DRAWINGS

Reference is now made to the following descriptions taken in conjunction with the accompanying drawings, in which.

DETAILED DESCRIPTION

As noted above, most digital systems rely on a clock to provide at least one clock signal so that the digital systems, e.g., mobile devices, desktop computers, and rack-mounted compute nodes in data centers, execute instructions that enable them to perform their intended functions. Typically this clock consists of a circuit including a quartz crystal external to processors of the digital system. Additionally, a clock signal generated by this external circuit employing the quartz crystal can be used to internally generate a number of other clock signals for use by the processors of the digital system, e.g., by using phase-locked loop (PLL) circuits to generate PLL clocks used by the processors of the digital system. In most instances, a plurality of clock signals must be generated for the digital system.

In some cases, the external clock circuit can be physically accessed, allowing for manipulation of the clock signal generated by the external clock circuit. An entity, e.g., a hacker, can maliciously alter the clock signal thereby causing the above-noted clock abnormalities. As a result, the hacker can access the digital system by this malicious manipulation of the clock signal thereby creating security concerns for the digital system.

In other scenarios, the clock signals generated by the external circuit utilizing the quartz crystal and/or the internal clock signals, e.g., the PLL clocks generated by the internal PLLs, can be influenced by physical phenomena, e.g., gamma rays impinging on the clock signals which can cause the above-noted clock abnormalities, much like the hacker can cause the clock abnormalities as described above. In digital systems where safety is significantly important, the clock signals, either the externally generated clocks signals or the internally generated clock signals, such as the PLL clock signals, or both, must be verified to be free of any influence from natural phenomena influences. Examples of such digital systems where safety is significantly important are autonomous driving computing platforms, robotic systems, and autonomous vision computing platforms. In some cases various industry standards for clock signal integrity need to be met. For example, in autonomous driving applications, conformance to the ISO 26262 standard is required in many instances.

In at least both cases above, i.e., the security concerns to avoid malicious influence on clock signals input to digital systems and the safety concerns to avoid natural phenomena influence on clock signals externally provided to or internally generated to digital systems, monitoring of the clock signals is desired to determine if the clock signal is as expected or not, i.e., to detect the above-noted clock abnormalities, where the monitoring of the clock signal can yield an alert if there is a difference between the received clock signal and an expected clock signal. Further, it is desired that no false positive alerts are generated by the monitoring of the clock signals and that the monitoring of the clock signals is reliable, detecting the clock abnormalities in every instance. Additionally, it is necessary that the monitoring of each of the clock signals can be implemented using a very small area of silicon with a very low consumption of power.

This disclosure provides a low power and reduced area clock monitoring circuit using a capacitor and constant current sink, a system employing the circuit, a method of operating the circuit, and a method of manufacturing the circuit to monitor a clock signal for the above-noted clock abnormalities. The disclosed clock monitoring circuit takes up very little area of silicon, e.g., in some embodiments an area savings of up to 33% as compared to conventional clock monitoring circuits can be achieved with similar quality metrics. The disclosed clock monitoring circuit consumes very, very little power, e.g., in some embodiments a power savings of up to 98% (typical power consumption, e.g., can be as low as 14.5 µW) as compared to conventional clock monitoring circuits can be achieved with similar quality metrics.

The disclosed low power and reduced area clock monitoring circuit and method utilize a known constant current sink decreasing charge on a capacitance at a known rate where the charge is replenished based on edge transitions of the clock signal input to the clock monitoring circuit (e.g., from the low to high phase or from the high to low phase of the clock signal, as disclosed above). Detection of the clock slowing and speeding up can be performed by the clock monitoring circuit. Further, using the detection of the clock signal slowing and/or speeding up, detection of clock signal missing pulses, clock glitches (duty cycle distortion), and cycle to cycle variations can be determined as well. The disclosed low power and reduced area clock monitoring circuit and method can include slow clock detection, fast clock detection, or both.

Figure 1:
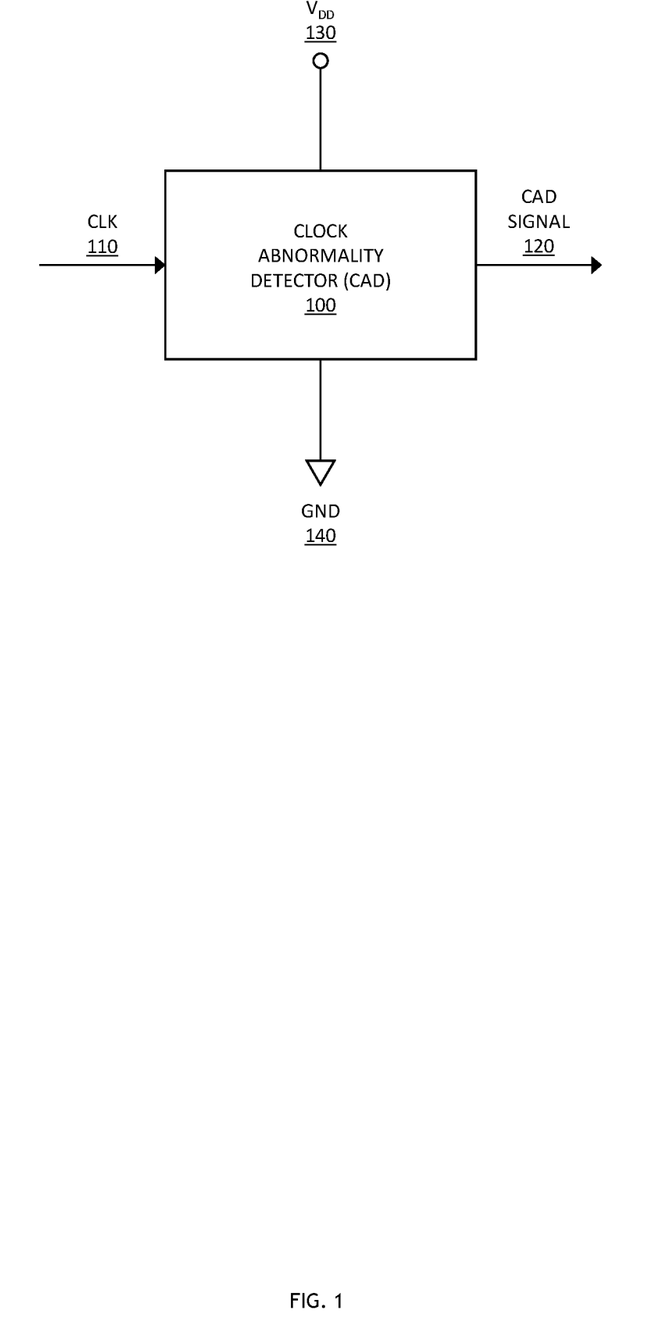
FIG. 1 illustrates an embodiment of a clock abnormality detector (CAD) in which at least a portion of the circuitry and methods disclosed herein can be implemented.

Referring to the drawings, specifically FIG. 1 is a block diagram illustrating an example of a low power and area clock monitoring circuit using a capacitor and constant current sink 100, otherwise termed as a clock abnormality detector (CAD). A clock 110 to be monitored by the CAD, e.g., the clock signal generated by an external circuit employing the quartz crystal or one of the clock signals internally generated by the PLL circuits as disclosed above, are input to the CAD 100. When the CAD 100 detects one of the above-disclosed clock anomalies, e.g., missed single clock pulses, shorter pulses, longer pulses, glitches, and cycle to cycle variation of the clock signal, the CAD 100 outputs a clock abnormality detect signal (CAD signal) 120. Typically, voltage supplied to CAD 100 is a $V_{DD}$ 130 voltage supply and, further, the CAD 100 is typically connected to ground (GND) return path 140.

Figure 2:
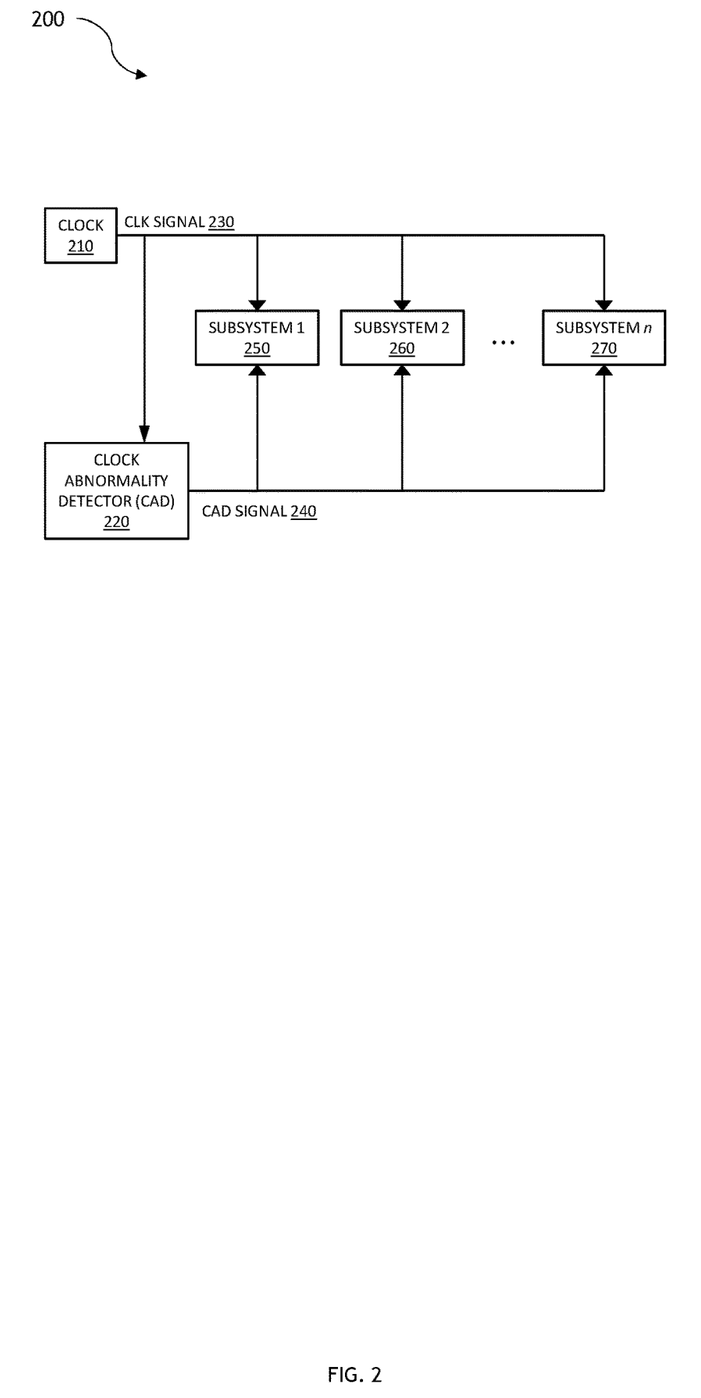
FIG. 2 illustrates an embodiment of a system using the CAD detector.

FIG. 2 illustrates a block diagram of an example system 200 utilizing the clock monitoring circuit 100 of FIG. 1. System 200 can be the above disclosed mobile devices, desktop computers, rack-mounted compute nodes in data centers, autonomous driving computing platforms, robotic systems, and autonomous vision computing platforms, etc. System 200 includes a clock 210 which generates clock signal 230. Clock signal 230 can be, e.g., the clock signal generated by an external circuit employing the quartz crystal or one of the clock signals internally generated by the PLL circuits as disclosed above, similar to clock 110 of FIG. 1. Clock signal 230 is fed to clock abnormality detector (CAD) 220 which is similar to CAD 100 of FIG. 1. System 200 also includes a plurality of subsystems such as subsystem 1 250, subsystem 2 260, through subsystem n 270 as depicted in FIG. 2. Subsystems 1-n correspond to, e.g., the various processing subsystems disclosed above, e.g., the one or more central processing units ("CPUs"), one or more graphics processing units ("GPUs"), one or more memory controllers, or any other subsystems that are typically present in a computing device. Clock signal 230 is also fed to subsystems 1-n (e.g., subsystems 250, 260, 270).

As with CAD 100 of FIG. 1, CAD 220 of FIG. 2 detects clock abnormalities, e.g., one of the above-disclosed clock anomalies such as missed single clock pulses, shorter pulses, longer pulses, glitches, and cycle to cycle variation of the clock signal. When CAD 220 detects one or more of these clock anomalies, CAD 220 generates CAD signal 240 which is fed to subsystems 1-n (e.g., subsystems 250, 260, 270). When one or more of subsystems 250, 260, 270 receives CAD signal 230 from CAD 220, the one or more subsystem can, e.g., reset the subsystem (typically, e.g., in the above-disclosed security concerns) or log instances of the CAD signal 240 (typically, e.g., in the above-disclosed safety concerns). Of course, the subsystems 250, 260, 270, when receiving the CAD signal 240 from CAD 220 can perform other operations.

Figure 3:
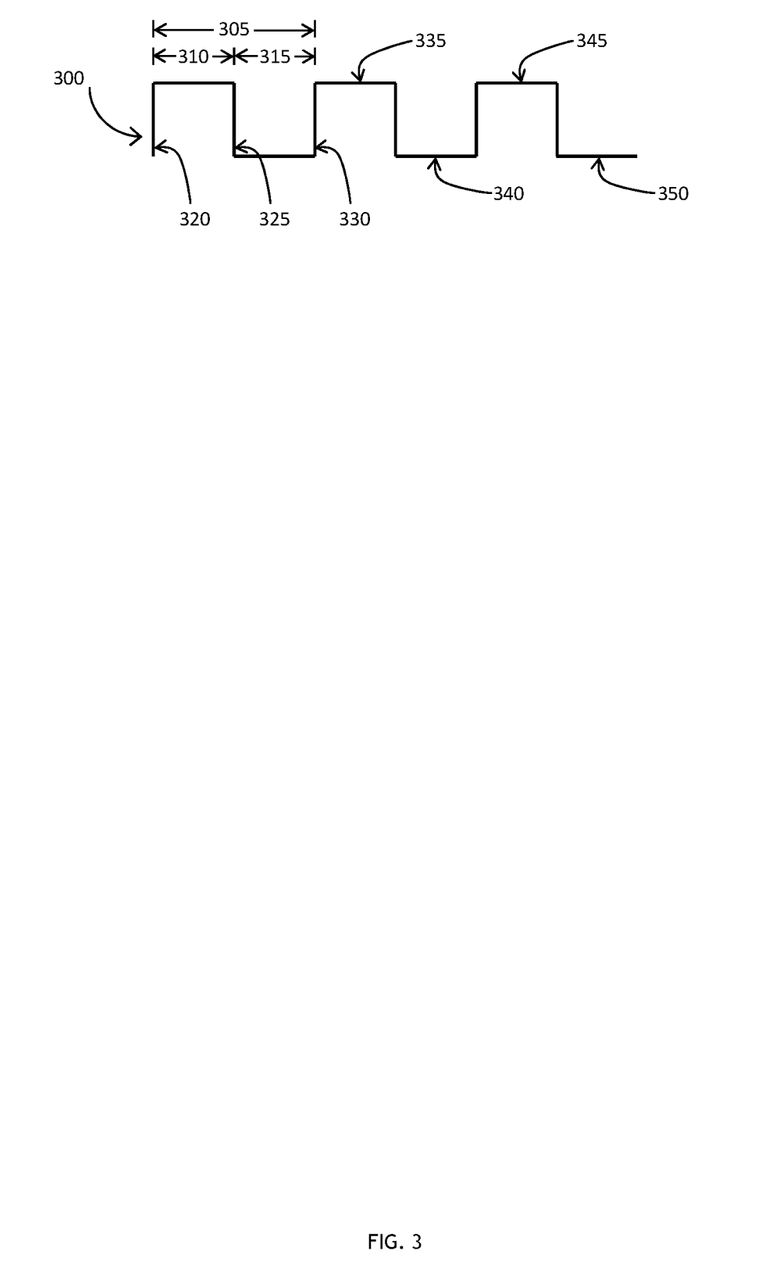
FIG. 3 illustrates an embodiment of a clock signal monitored by the CAD.

Clock signals such as those disclosed above may take a variety of forms. FIG. 3 illustrates an example clock signal 300. Clock signal 300 exhibits a cycle 305 during normal operation. A clock cycle corresponds to one clock period. A duration of the clock period for a given clock signal depends on a frequency at which the clock signal oscillates. For example, a clock signal oscillating at a frequency of 1 GHz exhibits $10^9$ cycles per second and exhibits a clock period having a duration of $10^{-9}$ seconds.

As disclosed above, each clock cycle 305 includes two opposite-state phases 310/315 in the sense that one of them corresponds to a clock state having a "high" voltage level (a "high phase" or "high clock state") while the other corresponds to a clock state having a "low" voltage level (a "low phase" or "low clock state"). As used herein, "high" and "low" are relative terms. A high voltage level may be, but need not be, e.g., substantially equal to a voltage supply level, e.g., $V_{DD}$. A low voltage level may be, but need not be, substantially equal to a ground voltage. A high voltage level may correspond to, e.g., a Boolean "true" value while a low voltage may correspond to, e.g., a Boolean "false" level or vice versa, depending on a design convention used for a given system.

Each phase of a clock signal has a start or a beginning and each phase has an end. For example, high phase 310, as depicted in FIG. 3 has a start or beginning 320 and an end 325. Similarly, low phase 315 has a start or beginning 325 and an end 330. A clock "edge" as used herein refers to a transition from one clock state, or clock phase, to another in a clock cycle. A clock edge may have one of two directions depending on whether the corresponding transition is from a low state (or phase) to a high state (or phase), e.g., a "rising edge" or from a high state (or phase) to a low state (or phase), e.g., a "falling edge." For example, the beginning 320 of clock phase 310 corresponds to a rising edge of clock signal 300 and the end 325 of clock phase 310 corresponds to a falling edge of clock signal 300. In clock signals that oscillate between opposite-state phases, the end of a previous phase may be equivalent to the start or beginning of a subsequent phase that immediately follows the previous phase. The start or beginning of any clock phase may be detected using a variety of techniques such as by detecting a clock edge, or by sensing a high or a low voltage level in the clock signal, or both.

The phrase "duty cycle" as used herein refers to a ratio between a high phase duration for a clock signal and the cycle period for the clock signal. Clock signal 300 is an example of a clock signal having a 50% duty cycle, since each of opposite-state phases 310, 315 has the same duration. Thus, the duration of high phase 310 is half that of cycle period 305. "Phase instance" as used herein refers to any one occurrence of any phase of a clock signal. For purposes of illustration, six phase instances of clock signal 300 are labeled in FIG. 3. High phase 310 represents a first phase instance of clock signal 300 and low phase 315 represents a second phase instance of clock signal 300. Similarly, phases 335, 340, 345, and 350 represent third, fourth, fifth, and sixth phase instances of clock signal 300, respectively. In this sense, clock signal 300 represents a series of clock phase instances. Moreover, phases 310, 335, and 345 correspond to first, second, and third instances of the high phase of clock signal 300, while phases 315, 340, and 350 correspond to first, second, and third instances of the low phase of clock signal 300.

It is helpful to employ a common analogy to understand how a clock abnormality detection in the clock monitoring circuit and method utilizing a capacitance charge change is implemented. For example, consider a bucket of water with a hole of a specific size in the bottom of the bucket that allows water to flow out of the bucket at a fixed rate (based on the size of the hole) as depicted in system 400 of FIG. 4. In this analogy, at a clock edge, i.e., either a transition from low phase (410) to high phase (420) of clock signal 405, e.g., rising edge 415, or a transition from high phase (420) to low phase (410) of clock signal 405, e.g., falling edge 425, water 440 in bucket 445 that has flowed out of bucket 445, e.g., water flow 460, is replenished to a specific level (e.g., full). Until the next replenishment (i.e., until the next edge of the clock, e.g., a rising edge 415 or falling edge 425), a level of water 440 in bucket 445 will fall at a rate determined by the size of the hole in bucket 445, e.g., water flow 460.

Figure 4:
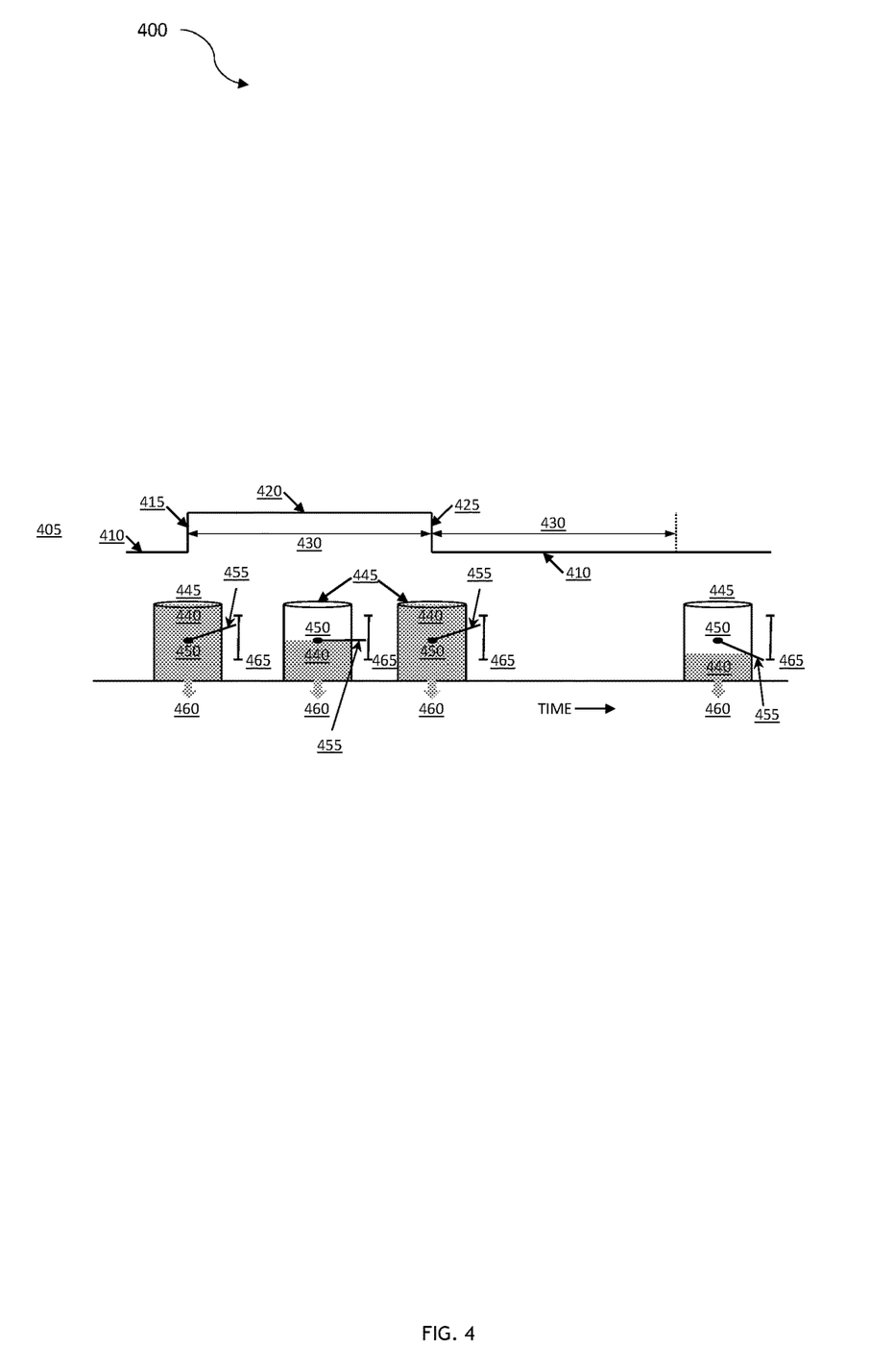
FIG. 4 illustrates an embodiment of an analogy to understand a clock slow detection (CSD)

In bucket 445, a swivel 450 is connected to a floating arm 455. Swivel 450 is fixed to central point in bucket 445. As water 440 rises in bucket 445 (when replenished at a clock edge, e.g., either rising edge 415 or falling edge 425), an end of floating arm 455 not anchored to swivel 450 will rise as well (while the other end of floating arm 455 is anchored at swivel 450-floating arm 455 rotating counter-clockwise as depicted in FIG. 4). As water 440 falls in bucket 445 (because of water flow 460 out of the hole in the bottom of bucket 445), the end of floating arm 455 not anchored to swivel 450 will fall as well (with the other end of floating arm 455 again anchored at swivel 450-floating arm 455 rotating clockwise as depicted in FIG. 4). The end of floating arm 455 not anchored at swivel 450 extends beyond bucket 445 (through, e.g., a water-tight slot in a side of bucket 445—not shown). When this end of floating arm 455 is above an error threshold, e.g., error threshold 465, no error signal is generated. However, when the end of floating arm 455 reaches or falls below the error threshold, e.g., error threshold 465, an error signal is generated.

Thus, if water 440 in bucket 445 is not replenished in an expected time, e.g., duration 430, water 440 in bucket 445 will lower (from water flow 460 out of the hole in bucket 445) such that the end of floating arm 455 not anchored by swivel 450 reaches (and falls below) error threshold 465 and an error signal will be generated. Therefore, when a duration of either a low (410) or high (420) phase of clock signal 405 is longer than expected duration 430, an error signal is generated since water flow 460 causes the end of rotating arm 455 not anchored by anchor 450 to reach or fall below error threshold 465. This indicates that clock signal 405 has slowed. In this example, a clock slow abnormality is present and an error signal is generated, e.g., a clock slow detect (CSD) signal.

Figure 5:
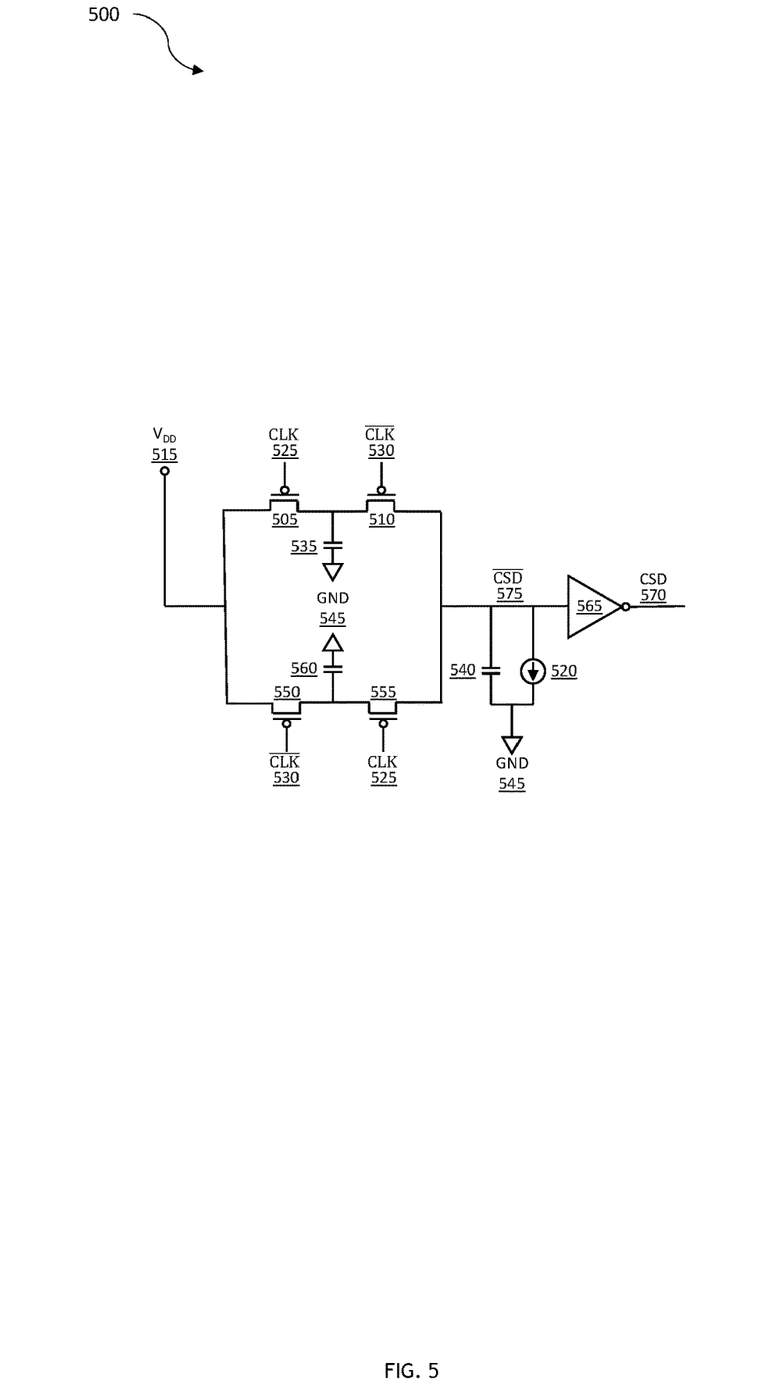
FIG. 5 illustrates an embodiment of a circuit diagram of a CSD circuit.

FIG. 5 illustrates a circuit diagram of a comparable electronic circuit 500 to the above water analogy for clock slow abnormality detection. Comparable circuit 500 includes a first pair of PMOS transistors connected in series, e.g., a drain of first PMOS transistor 505 of the first pair of PMOS transistors is connected a source of second PMOS transistor 510 of the first pair of PMOS transistors. The source of first PMOS transistor 510 is connected, e.g., to a voltage supply, e.g., $V_{DD}$ 515 and a drain of second PMOS transistor connected, e.g., to a constant current sink, e.g., $I_{CSD}$ 520. A gate of first PMOS transistor is connected, e.g., to a non-inverted version of the clock signal being monitored by the clock monitoring circuit, e.g., clock signal CLK 525 and a gate of second PMOS transistor 510 is connected, e.g., to an inverted version a of the clock signal input monitored by the clock monitoring circuit, e.g., clock signal CLK 530. Additionally, first capacitor 535, e.g., a 40 fF capacitor, is connected, e.g., between the drain of the first PMOS transistor 505, the source of second PMOS transistor 510, and ground 545. Further, second capacitor 540, e.g., a 5 fF capacitor is connected, e.g., between the drain of second PMOS transistor 510 and ground 545. Of course, first capacitor 535 and second capacitor 540 could be any value. Furthermore, in some embodiments first capacitor 535 and/or second capacitor 540 could be connected to a voltage reference, e.g., an intermediate voltage reference.

Comparable electronic circuit 500 further includes a second pair of PMOS transistors connected in series, e.g., a drain of first PMOS transistor 550 of the second pair of PMOS transistors is connected to a source of second PMOS transistor 555 of the second pair of PMOS transistors. The source of first PMOS transistor 550 of the second pair of PMOS transistors is connected, e.g., to voltage supply $V_{DD}$ 515 and a drain second PMOS transistor 555 of the second pair of PMOS transistors is connected, e.g., to the constant current sink, e.g., $I_{CSD}$ 520 and second capacitor 540. A gate of first PMOS transistor 550 of the second pair of PMOS transistors is connected, e.g., to the inverted version of the clock signal input to the clock monitoring circuit, e.g., clock signal CLK 530, and a gate of the second PMOS transistor 555 of the second pair of PMOS transistors is connected, e.g., to the non-inverted version of the clock signal input to the clock monitoring circuit, e.g., clock signal CLK 525. Additionally, third capacitor 560, e.g., another 40 fF capacitor, is connected, e.g., between the drain of first PMOS transistor 550 of the second pair of PMOS transistors, the source of the second PMOS transistor 555 of the second pair of PMOS transistors, and ground 545. In other embodiments, third capacitor 560 could be connected to the voltage reference, e.g., the intermediate voltage reference, rather than ground 545 and third capacitor 560 could be any value. Lastly, the constant current sink, e.g., $I_{CSD}$ 520, is further connected, e.g., to inverter 565, whose output is clock slow detect (CSD) signal 570.

In operation, for clock slow detection where a subsequent phase of a clock signal is longer than the immediately previous phase of the clock signal, when the non-inverted version a of the clock signal, e.g., clock signal CLK 525, is applied to the gate of PMOS transistor 505 is low, PMOS transistor 505 turns on allowing the voltage applied to the source of PMOS transistor 505, e.g., $V_{DD}$ 515, to charge capacitor 535. When the non-inverted version of the clock signal, e.g., clock signal CLK 525, is low, the inverted version of the clock signal, e.g., clock signal $\overline{CLK}$ 530, is high. At this time, since inverted clock signal $\overline{CLK}$ 530 is high and is applied to the gate of PMOS transistor 510, PMOS transistor 510 cannot turn on and, therefore, charge from capacitor 535 cannot be applied to charge capacitor 540. Similarly, when the non-inverted version of the clock signal, e.g., clock signal CLK 525, applied to PMOS transistor 555 is low, PMOS transistor 555 turns on and charge from capacitor 560 is allowed to charge capacitor 540. At this same time, as with PMOS transistor 510, PMOS transistor 550 is turned off (since inverted clock signal $\overline{CLK}$ 530 is high) and therefore the voltage at the source of PMOS transistor 550, e.g., $V_{DD}$ 515, cannot charge capacitor 560.

When the clock signal transitions to a low phase, e.g., as a result of a falling edge of the clock signal, non-inverted clock signal CLK 525 will be low and inverted clock signal $\overline{CLK}$ 530 will be high. When this happens, PMOS transistors 505 and 555 will be on and PMOS transistors 510 and 550 will be off. With these PMOS transistors in this state, capacitor 560 will be able to charge capacitor 540 and $V_{DD}$ 515 will be able to charge capacitor 535. Thus, for the duration the non-inverted version of the clock signal is high, e.g., clock signal CLK 525, capacitor 535 will be able to charge capacitor 540 while capacitor 560 is being recharged by $V_{DD}$ 515 and for the duration the inverted version of the clock signal is high, e.g., clock signal $\overline{CLK}$ 530, capacitor 560 will be able to charge capacitor 540 while capacitor 535 is being recharged by $V_{DD}$ 515. As capacitor 535 charges capacitor 540 (and, similarly, as capacitor 560 charges capacitor 540), the voltage at the side of capacitor 540 not connected to ground (or, in some embodiments, an intermediate voltage reference), e.g., voltage signal $\overline{CSD}$ 575, will decay as the charge from capacitor 535 (or, similarly, capacitor 560) decays. Constant current sink $I_{CSD}$ 520 sinks charge from capacitor 540 as well. Thus, during the duration of both the high and low phase of the clock signal, voltage signal $\overline{CSD}$ 575 will drop due leakage from capacitor 540 and constant current sink $I_{CSD}$ 520. If the duration of the low phase of the clock signal is too long, voltage signal $\overline{CSD}$ 575 will drop below a threshold, e.g., $V_{DD}/2$, before a next clock edge recharges capacitor 540 (e.g., when the clock signal transitions from a high to a low, i.e., a falling edge of the clock signal, capacitor 535 will no longer be charging capacitor 540 and capacitor 560 will recharge capacitor 540 bringing voltage signal $\overline{CSD}$ 575 above the threshold or, e.g., when the clock signal transitions from a low to a high, i.e., a rising edge of the clock signal, capacitor 560 will no longer be charging capacitor 540 and capacitor 535 will recharge capacitor 540 bringing voltage signal CSD 575 above the threshold). When voltage signal $\overline{CSD}$ 575 falls below the threshold, inverter 565 will assert a CSD signal, e.g., CSD signal 570.

Thus, when the duration of a subsequent phase of the clock signal is approximately equal to the duration of the immediately preceding phase, voltage signal $\overline{CSD}$ 575 will not fall below the threshold and capacitor 540 will be recharged before voltage signal $\overline{CSD}$ 575 falls below the threshold. However, when the duration of the low phase is long enough, voltage signal CSD 575 drops below the threshold and CSD signal 570 is asserted. The durations of the high and low phases of the clock signal are based on a frequency of the clock signal. In some embodiments, the amount of current the constant current sink, e.g., constant current sink $I_{CSD}$ 520, sinks can be configured to monitor differing clock frequencies since the amount of current constant current sink $I_{CSD}$ 520 sinks will affect how quickly voltage signal $\overline{CSD}$ 575 drops below the threshold. For shorter duration phases of the clock signal, i.e., for higher frequency clock signals, the amount of current the constant current sink, e.g., constant current sink $I_{CSD}$ 520, must be higher. (The amount of current the constant current sink, e.g., constant current sink $I_{CSD}$ 520 sinks is, in the analogy above, equivalent to a size of the hole in the bucket.)

Furthermore, the amount of current constant current sink $I_{CSD}$ 520 sinks can be configured to account for local variations of semiconductor material upon which comparable circuit 500 is fabricated (which would shift the threshold value). In some embodiments, the amount of current the constant current sink, e.g., constant current sink $I_{CSD}$ 520, can sink can be tuned to account for a frequency of the signal the clock monitoring circuit is to monitor or to account for these local variations. This tuning, in some embodiments, is based on conventional measurements of process, voltage, and temperature (PVT) parameters of the semiconductor material upon which comparable circuit 500 is fabricated. That is, PVT measurements are taken to tune the value of the amount of current the constant current sink, e.g., constant current sink $I_{CSD}$ 520, sinks to account for the frequency of the clock signal to be monitored, the local variations, and/or both. In some embodiments, the PVT measurements are used to characterize the threshold value. In some embodiments, this tuning is considered a self-tuning or self-calibrating loop to allow the clock monitoring circuit to adjust the threshold by adjusting the sink current level.

It is helpful to employ the same analogy as above to understand how a clock fast detection in the clock monitoring circuit and method utilizing the capacitance charge change is implemented. For example, consider a bucket of water with a hole of a specific size in the bottom of the bucket that allows water to flow out of the bucket at a fixed rate (based on the size of the hole) as depicted in system 600 of FIG. 6 (similar to the bucket in the system depicted in FIG. 4 as disclosed above). In this analogy, at a clock edge, i.e., either a transition from low phase (610) to high phase (620) of clock signal 605, e.g., rising edge 615, or a transition from high phase (620) to low phase (610) of clock signal 605, e.g., falling edge 625, water 640 in bucket 645 that has flowed out of bucket 645, e.g., water flow 660, is replenished to a specific level (e.g., full). Until the next replenishment (i.e., until the next edge of the clock, e.g., a rising edge 615 or falling edge 625), a level of water 640 in bucket 645 will fall at a rate determined by the size of the hole in bucket 645, e.g., water flow 660.

Figure 6:
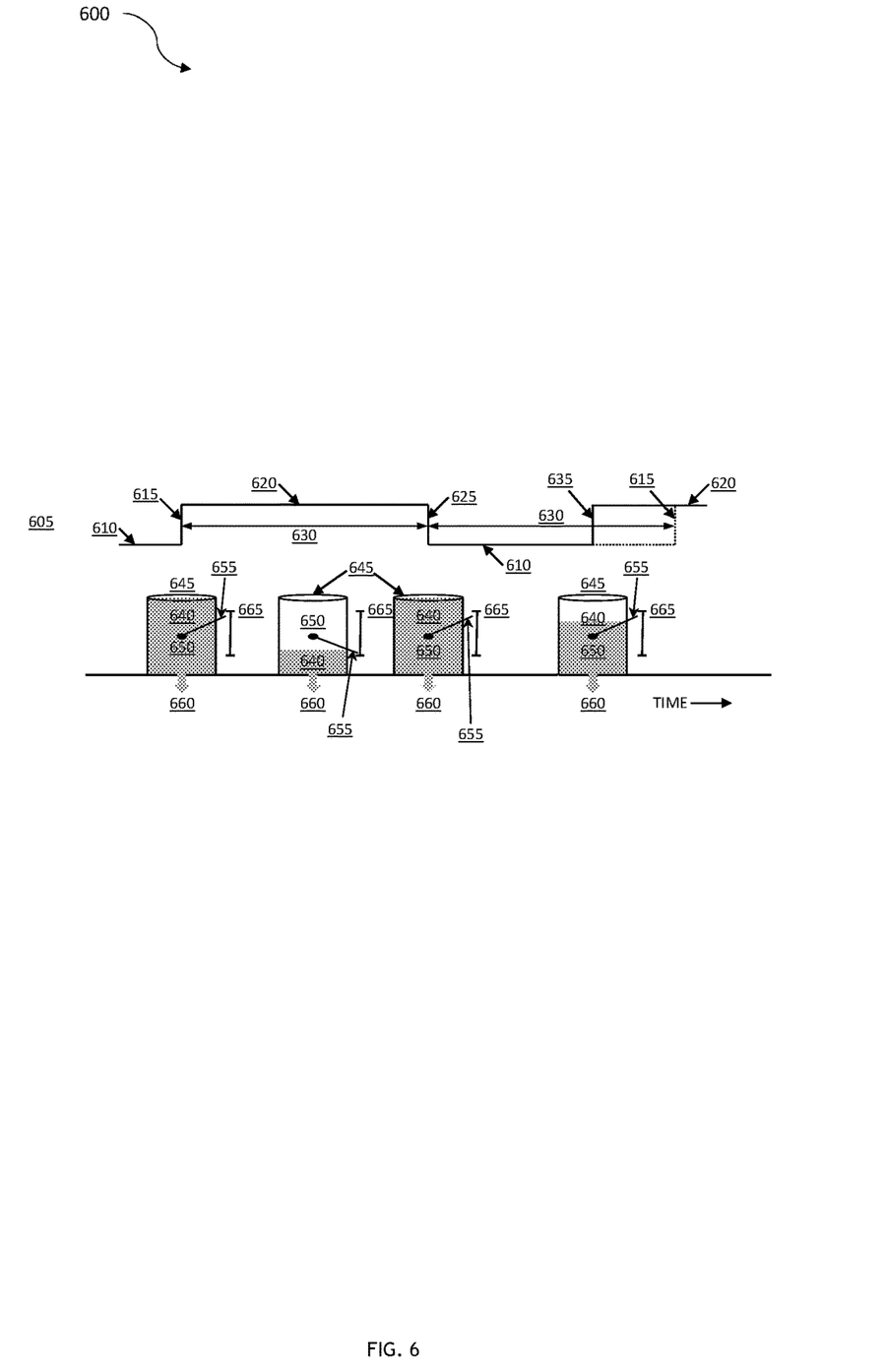
FIG. 6 illustrates an embodiment of an analogy to understand a clock fast detection (CFD)

As in FIG. 4 disclosed above, in bucket 645, a swivel 650 is connected to a floating arm 655 and is fixed at a central point in bucket 645. As water 640 rises in bucket 645 (when replenished at a clock edge, e.g., either rising edge 615 or falling edge 625), an end of floating arm 655 not anchored to swivel 650 will rise as well (while the other end of floating arm 655 is anchored at swivel 650-floating arm 655 rotating counter-clockwise as depicted in FIG. 6). As water 640 falls in bucket 645 (because of water flow 660 out of the hole in the bottom of bucket 645), the end of floating arm 655 not anchored to swivel 650 will fall as well (with the other end of floating arm 655 is anchored at swivel 650-floating arm 655 rotating clockwise as depicted in FIG. 6). The end of floating arm 655 not anchored at swivel 650 extends beyond buck 645 (through, e.g., a water-tight slot in a side of bucket 645—not shown). In this analogy, when this end of floating arm 655 is below an error threshold, e.g., error threshold 665, no error signal is generated. However, when this end of floating arm 655 reaches the error threshold, e.g., error threshold 665, an error signal is generated.

Thus, if water 640 in bucket 645 is replenished before an expected time, e.g., duration 630 at rising edge 635, water 640 in bucket 645 will rise from the replenishment such that the end of floating arm 655 not anchored by swivel 650 reaches error threshold 665 since water 640 in bucket 645 will not have had a chance to fully drain out of bucket 645 (from water flow 660 out of the hole in the bottom of bucket 645) before the replenishment and an amount residual water in the bucket and amount of the replenishment water will cause the end of floating arm 655 not anchored by swivel 650 to reach error threshold 665. When this happens, e.g., the end of floating arm 655 not anchored by anchor 650 reaches error threshold 665, an error signal will be generated. Therefore, when a duration of either a low (610) or high (620) phase of clock signal 405 is shorter than expected duration 630, an error signal is generated since the amount of residual water in bucket 645 not drained out through water flow 660 and the amount of the replenishment water causes the end of rotating arm 655 not anchored by anchor 650 to reach error threshold 665. This indicates that clock signal 605 has sped up. In this example, a clock fast abnormality is present and an error signal is generated, e.g., a clock fast detect (CFD) signal.

In addition to the end of floating arm 655 not anchored to anchored by anchor 650 reaching error threshold 665 when water is replenished in bucket 655 before all the water 640 is drained from bucket 645, the end of floating arm 655 not anchored at anchor 650 reaches error threshold 665 at both rising edge 615 and falling edge 625. However, error signals generated at these instances will be false error signals as they do not convey when, e.g., a clock fast abnormality is present. As disclosed below, no false error signals, e.g., CFD signals, will be generated at these instances.

Figure 7:
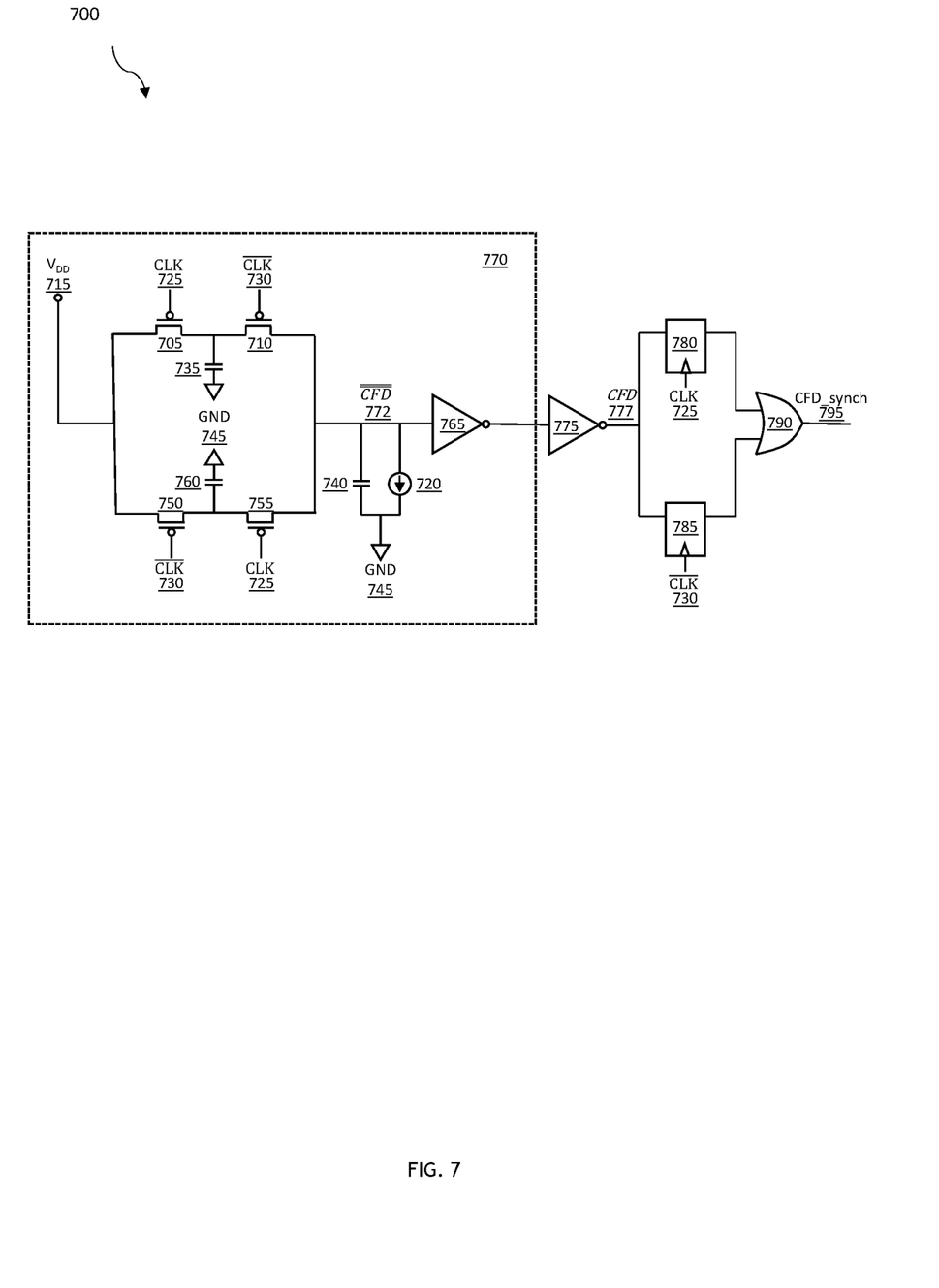
FIG. 7 illustrates an embodiment of a circuit diagram of a CFD circuit.

FIG. 7 illustrates a circuit diagram of an example of a comparable electronic circuit 700 to the above water analogy for clock fast abnormality detection. Comparable circuit 700 includes a first pair of PMOS transistors connected in series, e.g., a drain of first PMOS transistor 705 of the first pair of PMOS transistors is connected a source of second PMOS transistor 710 of the first pair of PMOS transistors. The source of first PMOS transistor 710 is connected, e.g., to a voltage supply, e.g., $V_{DD}$ 715 and a drain of second PMOS transistor connected, e.g., to a constant current sink, e.g., ICED 720. A gate of first PMOS transistor is connected, e.g., to a non-inverted version of the clock signal being monitored by the clock monitoring circuit, e.g., clock signal CLK 725 and a gate of second PMOS transistor 710 is connected, e.g., to an inverted version a of the clock signal input monitored by the clock monitoring circuit, e.g., clock signal $\overline{CLK}$ 730. Additionally, first capacitor 735, e.g., a 30 fF capacitor, is connected, e.g., between the drain of the first PMOS transistor 705, the source of second PMOS transistor 710, and ground 745. Further, second capacitor 740, e.g., a 5 fF capacitor is connected, e.g., between the drain of second PMOS transistor 710 and ground 745. Of course, first capacitor 735 and second capacitor 740 could be any value. Furthermore, in some embodiments first capacitor 735 and/or second capacitor 740 could be connected to a voltage reference, e.g., an intermediate voltage reference, rather than ground 745.

Comparable electronic circuit 700 further includes a second pair of PMOS transistors connected in series, e.g., a drain of first PMOS transistor 750 of the second pair of PMOS transistors is connected to a source of second PMOS transistor 755 of the second pair of PMOS transistors. The source of first PMOS transistor 750 of the second pair of PMOS transistors is connected, e.g., to voltage supply $V_{DD}$ 715 and a drain second PMOS transistor 755 of the second pair of PMOS transistors is connected, e.g., to the constant current sink, e.g., ICED 720 and second capacitor 740. A gate of first PMOS transistor 750 of the second pair of PMOS transistors is connected, e.g., to the inverted version of the clock signal input to the clock monitoring circuit, e.g., clock signal $\overline{CLK}$ 730, and a gate of the second PMOS transistor 755 of the second pair of PMOS transistors is connected, e.g., to the non-inverting version of the clock signal input to the clock monitoring circuit, e.g., clock signal CLK 725. Additionally, third capacitor 760, e.g., another 30 fF capacitor, is connected, e.g., between the drain of first PMOS transistor 750 of the second pair of PMOS transistors, the source of the second PMOS transistor 755 of the second pair of PMOS transistors, and ground 745. In other embodiments, third capacitor 760 could be connected to the voltage reference, e.g., the intermediate voltage reference, rather than ground 745 and third capacitor 760 could be any value. Lastly, the constant current sink, e.g., ICED 720, is further connected, e.g., to inverter 765. This portion 770 of comparable circuit 700 is similar circuit 500 of FIG. 5 as disclosed above.

The output of portion 770 of comparable circuit 700 is fed to inverter 775. The output of inverter 775 is fed to a pair of flip-flops, e.g., d-type flip-flops 780 and 785. This signal, e.g., voltage signal CFD 777, is similar to the CFD signal disclosed above with respect to FIG. 6. However, to avoid the false error signal generation disclosed above with regard to FIG. 6 at instances of rising and falling edges at expected durations (e.g., rising edge 615 and falling edge 625 at expected durations 630 for clock signal 605), flip-flop 780 is clocked by the non-inverting version a of the clock signal being monitored by the clock monitoring circuit, e.g., clock signal CLK 725 and flip-flop 785 is clocked by inverting version a of the clock signal being monitored by the clock monitoring circuit, e.g., clock signal $\overline{CLK}$ 730. The outputs of flip-flops 780 and 785 are fed to a logic function, e.g., OR-gate 790. The output of OR-gate 790 is a synchronized clock fast detect (CFD_synch) signal 795 which removes the false error signals disclosed above.

In operation, for clock fast detection where a subsequent phase of a clock signal is shorter than the immediately previous phase of the clock signal, when then non-inverted version a of the clock signal, e.g., clock signal CLK 725, is-applied to the gate of PMOS transistor 705 is low, PMOS transistor 705 turns on allowing the voltage applied to the source of PMOS transistor 705, e.g., $V_{DD}$ 715, to charge capacitor 735. When the non-inverted version of the clock signal, e.g., clock signal CLK 725 is low, the inverted version of the clock signal, e.g., clock signal $\overline{CLK}$ 730, is high. At this time, since inverted clock signal $\overline{CLK}$ 730 is high and is applied to the gate of PMOS transistor 710, PMOS transistor 710 cannot turn on and, therefore, charge from capacitor 735 cannot be applied to charge capacitor 740. Similarly, when the non-inverted version of the clock signal, e.g., clock signal CLK 725, applied to PMOS transistor 755 is low, PMOS transistor 755 turns on and charge from capacitor 760 is allowed to charge capacitor 740. At this same time, as with PMOS transistor 710, PMOS transistor 750 is turned off (since inverted clock signal CLK 730 is high) and therefore the voltage at the source of PMOS transistor 750, e.g., $V_{DD}$ 715, cannot charge capacitor 760.

When the clock signal transitions to a low phase, e.g., as a result of a falling edge of the clock signal, non-inverted clock signal CLK 725 will be low and inverted clock signal $\overline{CLK}$ 725 will be high. When this happens, PMOS transistors 705 and 755 will be on and PMOS transistors 710 and 730 will be off. With these PMOS transistors in this state, capacitor 760 will be able to charge capacitor 740 and VDD 715 will be able to charge capacitor 735. Thus, for the duration the non-inverted version of the clock signal is high, e.g., clock signal CLK 725, capacitor 735 will be able to charge capacitor 740 while capacitor 760 is being recharged by $V_{DD}$ 715 and for the duration of the inverted version of the clock signal is high, e.g., clock signal CLK 725, capacitor 760 will be able to charge capacitor 740 while capacitor 735 is being recharged by $V_{DD}$ 715. As capacitor 735 charges capacitor 740 (and, similarly, as capacitor 760 charges capacitor 740), the voltage at the side of capacitor 740 not connected to ground (or, in some embodiments, an intermediate voltage reference), e.g., voltage signal $\overline{CFD}$ 772, will decay as the charge from capacitor 735 (or, similarly, capacitor 760) decays. Constant current sink $I_{CFD}$ 720 sinks charge from capacitor 740 as well. Thus, during the duration of both the high and low phase of the clock signal, voltage signal $\overline{CFD}$ 772 will drop due leakage from capacitor 740 and constant current sink $I_{CFD}$ 720. If the duration of the high phase of the clock signal is too short, voltage signal $\overline{CFD}$ 772 will remain above a threshold, e.g., $V_{DD}/2$, before a next clock edge recharges capacitor 740 (e.g., when the clock signal transitions from a high to a low, i.e., a falling edge of the clock signal, capacitor 735 will no longer be charging capacitor 740 and capacitor 760 will recharge capacitor 740 or, e.g., when the clock signal transitions from a low to a high, i.e., a rising edge of the clock signal, capacitor 760 will no longer be charging capacitor 740 and capacitor 735 will recharge capacitor 740). When voltage signal $\overline{CFD}$ 772 remains above the threshold, inverters 765 and 775 will assert a CFD signal, e.g., CFD signal 777.

Thus, when the duration of a subsequent phase of the clock signal is approximately equal to the duration of the immediately preceding phase, voltage signal $\overline{CFD}$ 772 will not remain above the threshold. However, when the duration of the high phase is short enough, voltage signal $\overline{CFD}$ 772 remains above the threshold and CFD signal 777 is asserted. The durations of the high and low phases of the clock signal are based on a frequency of the clock signal. In some embodiments, the amount of current the constant current sink, e.g., constant current sink $I_{CFD}$ 720, sinks can be configured to monitor differing clock frequencies since the amount of current constant current sink $I_{CFD}$ 720 sinks will affect how quickly voltage signal $\overline{CFD}$ 772 drops below the threshold. For shorter duration phases of the clock signal, i.e., for higher frequency clock signals, the amount of current the constant current sink, e.g., constant current sink $I_{CFD}$ 720, must be higher. (The amount of current the constant current sink, e.g., constant current sink ICED 720 sinks is, in the analogy above, equivalent to a size of the hole in the bucket.)

Furthermore, the amount of current constant current sink $I_{CFD}$ 720 sinks can be configured to account for local variations of semiconductor material upon which comparable circuit 700 is fabricated (which would shift the threshold value) similar to the configuration of constant current sink $I_{CSD}$ 520 disclosed above. In some embodiments, the amount of current the constant current sink, e.g., constant current sink $I_{CFD}$ 720, can sink can be tuned to account for a frequency of the signal the clock monitoring circuit is to monitor or to account for these local variations. This tuning, in some embodiments, is based on conventional measurements of process, voltage, and temperature (PVT) parameters of the semiconductor material upon which comparable circuit 700 is fabricated. That is, PVT measurements are taken to tune the value of the amount of current the constant current sink, e.g., constant current sink ICED 720, sinks to account for the frequency of the clock signal to be monitored, the local variations, and/or both. In some embodiments, this tuning is considered a self-tuning or self-calibrating loop to allow the clock monitoring circuit to adjust the threshold by adjusting the sink current level.

In the above-disclosed circuits, capacitance charging is used for the detection of both a slow and fast clock. The power requirement, e.g., the only power requirement, of the above-disclosed circuits, unlike other conventional detection circuits which constantly monitor every edge of the clock signal input to the clock monitoring circuit consuming power, is the current the constant current sink uses to charge and discharge the capacitors. As such, the power consumption of the above-disclosed clock monitoring circuit is extremely low compared to conventional clock monitoring circuits and, therefore, the above-disclosed clock monitoring circuit is very advantageous in battery powered device applications, especially handheld device applications. In some cases, the power consumption of the above-disclosed clock monitoring circuit is on the order of tens of microwatts, e.g., about 14.5 μW. However, as disclosed above, the constant current sink can be tuned for specific process, voltage, and temperature conditions of silicon on which the above-disclosed clock monitoring circuit is manufactured to provide the above-disclosed thresholds required to detect the slow clock, fast clock, or both. In some embodiments, only the CSD circuit may be employed and not the CFD circuit.

Figure 8:
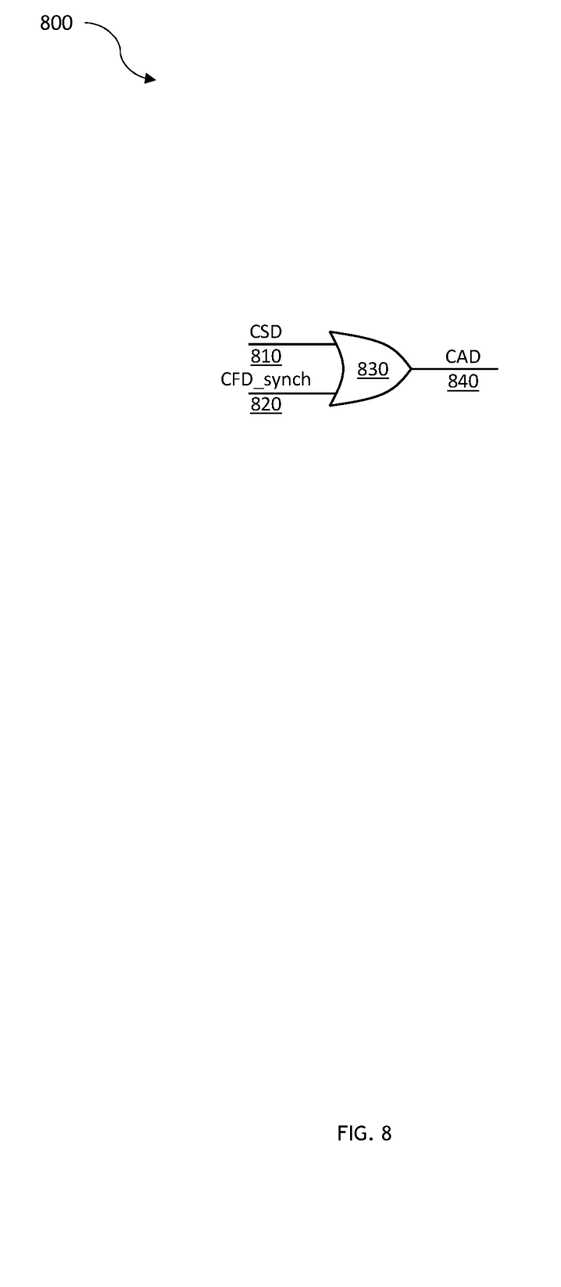
FIG. 8 illustrates an embodiment of an embodiment of a clock abnormality detect (CAD) signal generator.

FIG. 8 illustrates an embodiment of a block diagram for a clock abnormality detect (CAD) signal generator 800 constructed according to principles of the disclosure. In one embodiment of CAD signal generator 800, a clock slow detect signal, e.g., CSD signal 810, and a clock fast detect synch signal, e.g., CFD_synch signal 820, are input to a logic function, e.g., OR-gate 830. CSD signal 810 is similar to CDS signal 570 of FIG. 5 and CFD_synch signal 820 is similar to CFD_synch signal 795 of FIG. 7. CAD signal generator 800 outputs a CAD signal, e.g., CAD signal 840, if either a clock slow detect signal (e.g., CSD signal 810) or a clock fast detect synch signal (e.g., CFD_synch signal 820) is input to CAD signal generator 800. In the embodiments where only the CSD is employed, the CSD signal, e.g., CSD signal 570 if FIG. 5 as disclosed above, is used as the CAD signal. While the CSD and CFD generators 500 and 700, respectively, detect when a frequency of the clock signal speeds up or slows down as disclosed above, the CSD and CFD generators 500 and 700, respectively, will also detect other types of clock abnormalities, i.e., when clock stops oscillating altogether (a clock stop), when the clock exhibits a duty cycle other than that expected (a clock glitch), when a clock cycle is missed, and when there is a cycle to cycle variation of the clock as in each of these clock abnormalities the LPC will differ from the HPC.

Figure 9:
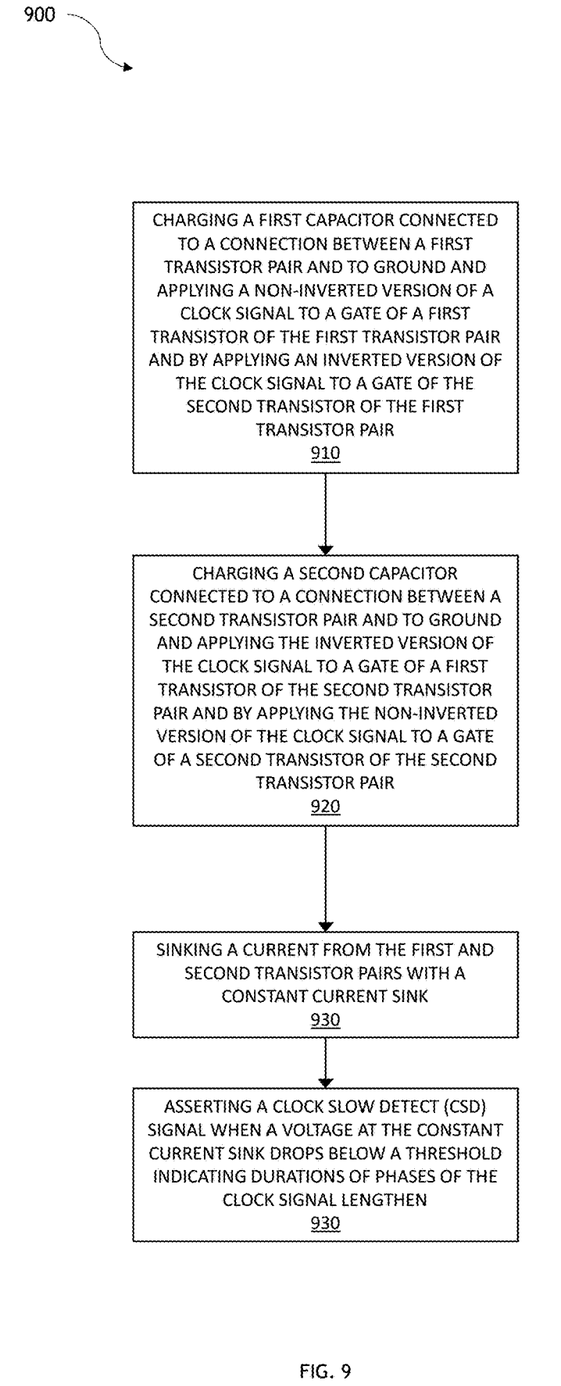
FIG. 9 illustrates a flow diagram of an example method for generating a CAD signal.

FIG. 9 illustrates a flow diagram 900 of an example method for monitoring a clock signal input to a clock monitoring circuit according to principles of the disclosure. In a step 910, a first capacitor connected to a connection between a first transistor pair and to ground (or a voltage reference, e.g., an intermediate voltage reference) is charged by applying a non-inverted version of the clock signal to a gate of a first transistor of the first transistor pair and by applying an inverted version a of the clock signal to a gate of a second transistor of the first transistor pair. In a step 920 a second capacitor connected to a connection between a second transistor pair to ground (or the voltage reference, e.g., the intermediate voltage reference) is charged by applying the inverted version of the clock signal to a gate of a first transistor of the second transistor pair and by applying the non-inverted version of the clock signal to a gate of a second transistor of the second transistor pair. In a step 930 a constant current sink sinks current from the first and second transistor pairs. In a step 940 a clock slow detect (CSD) signal is asserted when a voltage at the constant current sink drops below a threshold indicating durations of phases of the clock signal lengthen.

The above-disclosed clock monitoring circuit detects the above-defined clock abnormalities, specifically, missed single clock pulses, shorter pulses, glitches, and, importantly, cycle to cycle variation of the clock signal. Moreover, the above-disclosed clock monitoring circuit does not generate false positive alerts and detects clock abnormalities for every clock cycle. The above-disclosed low power and area clock monitoring circuit requires smaller silicon area and has significantly smaller power consumption requirements than conventional clock monitoring circuits. As such, many instances of the above-disclosed clock monitoring circuits can be deployed on a single integrated circuit to monitor many different clock signals.

Instances of the above-disclosed clock monitoring circuit can be deployed on an integrated circuit (IC), each instance deployed to monitor one of a plurality of clocks used in the IC. The clock being monitored can be the above-described clock signal generated by clock circuit external to the IC that includes the quartz crystal. Or the clock being monitored can be clocks generated internally in the IC by, e.g., PLL generated PLL clocks. The externally generated clock signals and/or the internally generated clock signals are supplied to various processing subsystems of the IC. Examples of the subsystems of the IC can be one or more central processing units ("CPUs"), one or more graphics processing units ("GPUs"), one or more memory controllers, or any other subsystems that are typically present in a computing device. The CAD signal generated by the clock monitoring circuit on the IC can be input to the various processing subsystems of the IC where the various processing subsystems act on the CAD signal. For example, for the above-mentioned security concerns, some or all of the various processing subsystems could reset upon receipt of the CAD signal. And, e.g., for the above-mentioned safety concerns some or all of the various processing subsystems could log instances of the CAD signal and, in some instances, reset the various processing subsystems.

Those skilled in the art to which this application relates will appreciate that other and further additions, deletions, substitutions and modifications may be made to the described embodiments.

What is claimed is:

1. A clock monitoring circuit for monitoring a clock signal, comprising:
   a clock slow detection (CSD) circuit configured to assert a CSD signal when durations of phases of the clock signal lengthen, wherein the CSD circuit comprises:
   two pairs of transistors, each pair connected in series and a first capacitor connected to a connection between a first pair of the two pairs of transistors and to a voltage reference and a second capacitor connected to a connection between a second pair of the two pairs of transistors and the voltage reference;
   a third capacitor connected to drains of a second transistor of each of the two pairs of transistors and to the voltage reference;
   a constant current sink connected to the drains of the second transistor of each of the two pairs of transistors and to the voltage reference; and
   an inverter coupled to the third capacitor and constant current sink; wherein:
   a voltage supply is connected to a source of a first transistor of each of the two pairs of transistors;
   a non-inverted version of the clock signal is connected to gates of the first transistor of the first transistor pair and the second transistor of the second transistor pair; and
   an inverted version a of the clock signal is connected to gates of the second transistor of the first transistor pair and the first transistor of the second transistor pair.

2. The clock monitoring circuit as recited in claim 1, wherein the transistors of the first and second pair of transistors are PMOS transistors.

3. The clock monitoring circuit as recited in claim 1, wherein the first and second capacitors have a value of about 40 fF and the third capacitor has a value of about 5 fF.

4. The clock monitoring circuit as recited in claim 1, further comprising a clock fast detection (CFD) circuit configured to assert a CFD synch signal when durations of phases of the clock signal shorten, the CFD circuit comprising:
   a second CSD circuit;
   an inverter connected to an output of the second CSD circuit;
   first flip flop connected to an output of the inverter, wherein the first flip-flop is clocked by the non-inverted version of the clock signal;
   a second flip connected to the output of the inverter, wherein the second flip-flop is clocked by the inverted version of the clock signal; and
   a first logic circuit connected to an output of both the first and second flip-flops and configured to provide the CFD synch signal based on outputs from the first and second flip-flops.

5. The clock monitoring circuit as recited in claim 4, further comprising a second logic circuit which receives an output from both the CSD circuit and the CFD circuit and configured to output a clock abnormality detect (CAD) signal from the clock monitoring circuit when either the CSD signal or the CFD sync signal is asserted.

6. The clock monitoring circuit as recited in claim 5, wherein the first and second logic functions are an or-gate.

7. The clock monitoring circuit as recited in claim 5, wherein the values of the first, second, and third capacitors and an amount of current sunk by the constant current sink for either of the CSD circuit or the CFD circuit is dependent on process, voltage, and temperature conditions of silicon on which the clock monitoring circuit is manufactured.

8. The clock monitoring circuit as recited in claim 1, wherein the voltage reference comprises an intermediate voltage reference.

9. The clock monitoring circuit as recited in claim 1, wherein the voltage reference comprises ground.

10. The clock monitoring circuit as recited in claim 1, wherein the constant current sink is configured to sink an amount of current based on a frequency of the clock signal.

11. The clock monitoring circuit as recited in claim 1, wherein the constant current sink is configured to sink an amount of current based on variation of parameters of semiconductor material local to the clock monitoring circuit.

12. An integrated circuit (IC), comprising:
    at least one processing subsystem; and at least one clock monitoring circuit for monitoring a clock signal coupled to the clock signal externally generated from the IC or a plurality of clock signals generated internal to the IC and the at least one processing subsystem, wherein the at least one clock monitoring circuit comprises a clock slow detection (CSD) circuit configured to assert a CSD signal when durations of phases of the clock signal lengthen and wherein the CSD circuit includes:
  two pairs of transistors, each pair connected in series and a first capacitor connected to a connection between a first pair of the two pairs of transistors and to a voltage reference and a second capacitor connected to a connection between a second pair of the two pairs of transistors and to the voltage reference;
  a third capacitor connected to drains of a second transistor of each of the two pairs of transistors and to the voltage reference;
  a constant current sink connected to the drains of the second transistor of each of the two pairs of transistors and to the voltage reference; and
  an inverter coupled to the third capacitor and constant current sink; wherein:
    a voltage supply is connected to a source of a first transistor of each of the two pairs of transistors;
    a non-inverted version of the clock signal is connected to gates of the first transistor of the first transistor pair and the second transistor of the second transistor pair; and
    an inverted version a of the clock signal is connected to gates of the second transistor of the first transistor pair and the first transistor of the second transistor pair.

13. The IC as recited in claim 12, wherein the clock slow detection circuit further comprises a clock fast detection (CFD) circuit configured to assert a CFD synch signal when durations of phases of the clock signal shorten and wherein the CFD circuit comprises:
  a second CSD circuit;
  an inverter connected to the second CSD circuit;
  a first flip flop connected to an output of the inverter, wherein the first flip-flop is clocked by the non-inverted version of the clock signal;
  a second flip connected to the output of the inverter, wherein the second flip-flop is clocked by the inverted version of the clock signal; and
  a first logic function connected to an output of both the first and second flip-flops and configured to output the CFD synch signal based on outputs from the first and second flip-flops.

14. The clock monitoring circuit as recited in claim 13, further comprising a second logic function configured to provide a clock abnormality detect (CAD) signal when either the CSD or the CFD synch signals are asserted.

15. The IC as recited in claim 12, wherein the plurality of clock signals generated internal to the IC are generated by phase-locked loop circuits (PLLs).

16. The IC as recited in claim 12, wherein the plurality of processing subsystems include one or more central processing units (CPUs), one or more graphics processing units (GPUs), and one or more memory controllers.

17. The IC as recited in claim 12, wherein at least some of the plurality of processing subsystems reset upon generation of the CAD signal by the clock monitoring circuit.

18. The IC as recited in claim 12, wherein at least some of the plurality of processing subsystems log instances of instances of the CAD signal by the clock monitoring circuit.

19. The IC as recited in claim 12, wherein the voltage reference comprises an intermediate voltage reference.

20. The IC as recited in claim 12, wherein the voltage reference comprises ground.

21. The IC as recited in claim 12, wherein the constant current sink is configured to sink an amount of current based on a frequency of the clock signal.

22. The IC as recited in claim 12, wherein the constant current sink is configured to sink an amount of current based on variation of parameters of semiconductor material local to the clock monitoring circuit.

23. A method of operating a clock monitoring circuit for monitoring a clock signal, comprising:
  charging a first capacitor connected to a connection between a first pair of transistors and to a voltage reference by applying a non-inverted version of the clock signal to a gate of a first transistor of the first pair of transistors and by applying an inverted version a of the clock signal to a gate of the second transistor of the first pair of transistors;
  charging a second capacitor connected to a connection between a second pair of transistors and to the voltage reference by applying the inverted version of the clock signal to a gate of a first transistor of the second pair of transistors and by applying the non-inverted version of the clock signal to a gate of a second transistor of the second pair of transistors;
  sinking a current from the first and second pair of transistors with a constant current sink; and
  asserting a clock slow detect (CSD) signal when a voltage at the constant current sink drops below a threshold indicating durations of phases of the clock signal lengthen.

24. The method as recited in claim 23, further comprising asserting a clock fast detect (CFD) synch signal when the voltage at the constant current sinks rises above the threshold indicating durations of the clock signal shorten.

25. The method as recited in claim 23, wherein the voltage reference comprises an intermediate voltage reference.

26. The method as recited in claim 23, wherein the voltage reference comprises ground.

27. The method as recited in claim 23, wherein an amount of the current sinked by the constant current sink is based on a frequency of the clock signal.

28. The method as recited in claim 23, wherein an amount of the current sinked by the constant current sink is based on variation of parameters of semiconductor material local to the clock monitoring circuit.

29. A method of manufacturing an integrated circuit (IC), comprising:
  forming a clock slow detection (CSD) circuit for monitoring a clock signal configured to assert a CSD signal when durations of phases the clock signal lengthen, the CSD circuit including:
    two pairs of transistors, each pair connected in series and a first capacitor connected to a connection between a first pair of the two pairs of transistors and to a voltage reference and a second capacitor connected to a connection between a second pair of the two pairs of transistors and to the voltage reference;
    a third capacitor connected to drains of a second transistor of each of the two pairs of transistors and to the voltage reference;
    a constant current sink connected to the drains of the second transistor of each of the two pairs of transistors and to the voltage reference; and an inverter coupled to the third capacitor and constant current sink; wherein:
a voltage supply is connected to a source of a first transistor of each of the two pairs of transistors;
a non-inverted version of the clock signal is connected to gates of the first transistor of the first transistor pair and the second transistor of the second transistor pair; and
an inverted version a of the clock signal is connected to gates of the second transistor of the first transistor pair and the first transistor of the second transistor pair.

30. The method of manufacturing an IC as recited in claim 29, further comprising forming a clock fast detection (CFD) circuit configured to assert a CFD synch signal when durations of phases of the clock signal shorten, the CFD circuit comprising:
a second CSD circuit;
a first flip flop connected to an output of the second CSD circuit, wherein the first flip-flop is clocked by the non-inverted version of the clock signal;
a second flip connected to the output of the second CSD circuit, wherein the second flip-flop is clocked by the inverted version of the clock signal; and
a first logic function connected to an output of both the first and second flip-flops and configured to provide the CFD synch signal based on outputs from the first and second flip-flops.

31. The method of manufacturing an IC as recited in claim 29, further comprising forming a second logic function configured to provide a clock abnormality detect (CAD) signal when either the CSD or the CFD synch signals are asserted.

32. A battery powered device, comprising:
at least one processing subsystem; and
a clock monitoring circuit coupled to an externally generated clock signal or a plurality of internally generated clock signals generated and the at least one processing subsystem, wherein the clock monitoring circuit comprises a clock slow detection (CSD) circuit configured to assert a CSD signal when durations of phases the clock signal lengthen, the CSD circuit including:
two pairs of transistors, each pair connected in series and a first capacitor connected to a connection between a first pair of the two pairs of transistors and to a voltage reference and a second capacitor connected to a connection between a second pair of the two pairs of transistors and to the voltage reference;
a third capacitor connected to drains of a second transistor of each of the two pairs of transistors and to the voltage reference;
a constant current sink connected between the drains of the second transistor of each of the two pairs of transistors and the voltage reference; and
an inverter coupled to the third capacitor and constant current sink; wherein:
a voltage supply is connected to a source of a first transistor of each of the two pairs of transistors;
a non-inverted version of the clock signal is connected to gates of the first transistor of the first transistor pair and the second transistor of the second transistor pair; and
an inverted version a of the clock signal is connected to gates of the second transistor of the first transistor pair and the first transistor of the second transistor pair.

33. The battery powered device as recited in claim 32, further comprising a clock fast detection (CFD) circuit configured to assert a CFD synch signal when durations of phases of the clock signal shorten, the CFD circuit comprising:
a second CSD circuit;
a first flip flop connected to an output of the second CSD circuit, wherein the first flip-flop is clocked by the non-inverted version of the clock signal;
a second flip connected to the output of the second CSD circuit, wherein the second flip-flop is clocked by the inverted version of the clock signal; and
a first logic function connected to an output of both the first and second flip-flops and configured to provide the CFD synch signal based on outputs from the first and second flip-flops.

34. The battery powered device as recited in claim 33, further comprising a second logic function configured to provide a clock abnormality detect (CAD) signal when either the CSD or the CFD synch signals are asserted.

35. The battery powered device as recited in claim 34, wherein the powered device logs instances of the CAD signal.

36. The battery powered device as recited in claim 34, wherein at least some of the plurality of processing subsystems reset based on the logged instances of the CAD signal.

37. The battery powered device as recited in claim 32, wherein the battery powered device is a handheld device.

38. The battery powered device as recited in claim 32, wherein the voltage reference comprises an intermediate voltage reference.

39. The battery powered device as recited in claim 32, wherein the voltage reference comprises ground.

40. The battery powered device as recited in claim 32, wherein the constant current sink is configured to sink an amount of current based on a frequency of the clock signal.

41. The battery powered device as recited in claim 32, wherein the constant current sink is configured to sink an amount of current based on variation of parameters of semiconductor material local to the clock monitoring circuit.

* * * * *